United States Patent [19]
Little et al.

[11] Patent Number: 5,710,849
[45] Date of Patent: Jan. 20, 1998

[54] TAPER SHAPES FOR FLATBAND RESPONSE AND SIDELOBE SUPPRESSION IN GRATING ASSISTED OPTICAL COUPLER FILTERS

[75] Inventors: Brent Little, Cambridge, Mass.; Chi Wu, Nepean; Wei-Ping Huang, Waterloo, both of Canada

[73] Assignee: Northern Telecom, Ltd., Montreal, Canada

[21] Appl. No.: 551,470

[22] Filed: Nov. 1, 1995

[51] Int. Cl.$^6$ ............................................. G02B 6/26
[52] U.S. Cl. .................. 385/50; 385/37; 385/129; 385/27; 385/43
[58] Field of Search ................... 385/50, 10, 37, 385/14, 9, 43, 129, 27, 132

[56] References Cited

U.S. PATENT DOCUMENTS

| | | | |
|---|---|---|---|
| 3,957,341 | 5/1976 | Taylor | 385/50 |
| 4,026,632 | 5/1977 | Hill et al. | 385/50 |
| 4,852,960 | 8/1989 | Alferness et al. | 385/37 |
| 5,285,508 | 2/1994 | Chikuma | 385/30 |
| 5,517,589 | 5/1996 | Takeuchi | 385/37 |

OTHER PUBLICATIONS

R. C. Alferness et al., "Filter Characteristics of Codirectionally Coupled Waveguides with Weighted Coupling", *IEEE J. Quantum Elec.* QE-14(11): 843-847, Nov. 1978.

R.C. Alferness, "Optical Directional Couplers with Weighted Coupling", *Appl. Phys. Lett.* 35(3): 260-262, Aug. 1979.

G. Song et al., "Design of Corrugated Waveguide Filters by the Gel'fand-Levitan-Marchenko Inverse-Scattering Method", *J. Opt. Soc. Am. A.* 2(11): 1905-1915, Nov. 1985.

(List continued on next page.)

*Primary Examiner*—Rodney B. Bovernick
*Assistant Examiner*—Hemang Sanghavi
*Attorney, Agent, or Firm*—Foley & Lardner

[57] ABSTRACT

Improvements in grating-assisted optical filter couplers are described. In particularly, taper shapes for the gratings-assisted codirectional couplers are determined to provide an out-of-band sidelobe suppression ratio of greater than −30 dB, and a passband response that is flat and has a transmission of greater than 99.55% of the transmission at the passband center, over a wavelength range of 25% of the half-power bandwidth.

The interaction strength defining the optimized spectral characteristics is given by $$K_1(z) = A_1 e^{-\alpha_1(z-z_1)^2} + A_2 e^{-\alpha_2(z-z_2)^2} A_3 e^{-\alpha_3(z-z_3)^2} \quad 0 < z < 1$$

where $K_1(z)$ is the normalized interaction strength along the propagation direction, and the constant coefficients are $A_1 = 8.774$; $A_2 = -3.45$; $A_3 = 1.183$;

$\alpha_1 = 51.87$; $\alpha_2 = 34.49$; $\alpha_3 = 20.63$;

$z_1 = 0.28$; $z_2 = 0.60$; $z_3 = 0.75$.

where z is the normalized distance and is related to the physical distance $Z = Z/L_c$, where $L_c$ is the coupler length. At the positions $z = 0.462$ and $z = 0.777$, where the function $K_1$ changes sign, the grating period is moved forward or backwards by one-half period.

The specified interaction strength $K_1$ is produced in practice by modulation of one of the physical parameters of a grating assisted coupler, for example by: (i) modulating the space relationship between two waveguides, (ii) modulating the refractive index contrast of the grating, (iii) modulating the duty cycle of the grating, (iv) modulating the height of a surface corrugation grating, (v) modulating the width of the grating regions, or (vi) modulating the ridge width of coupled ridge waveguides.

9 Claims, 14 Drawing Sheets

OTHER PUBLICATIONS

K. Winick, "Design of Grating–Assisted Waveguide Couplers with Weighted Coupling", *J. Lightwave Tech.* 9(11): 1481–1492, Nov. 1991.

B. Little et al., "Synthesis of Codirectional Couplers with Ultralow Sidelobes and Minimum Bandwidth", *Optics Letters* 20(11): 1259–1261, Jun. 1995.

H. Sakata, "Sidelobe Suppression in Grating–Assisted Wavelength–Selective Couplers", *Optics Letters* 17(7): 463–465, Apr. 1992.

G. Song, "Proposal for Acousto–Optic Tunable Filters with Near–Ideal Bandpass Characteristics", *Applied Optics* 33(25): 1–3 (1994). No Month Avail.

H. A. Haus et al., "Coupled–Mode Theory of Optical Waveguides", *J. Lightwave Tech.* LT–5(1): 16–23, Jan. 1987.

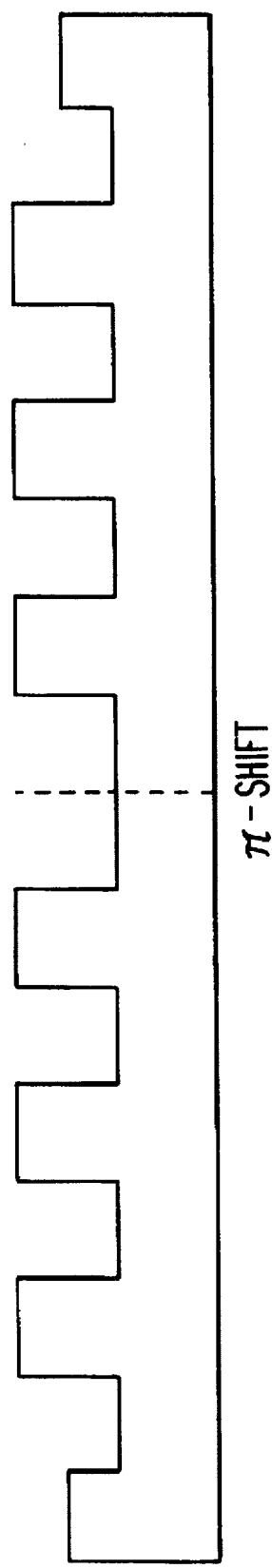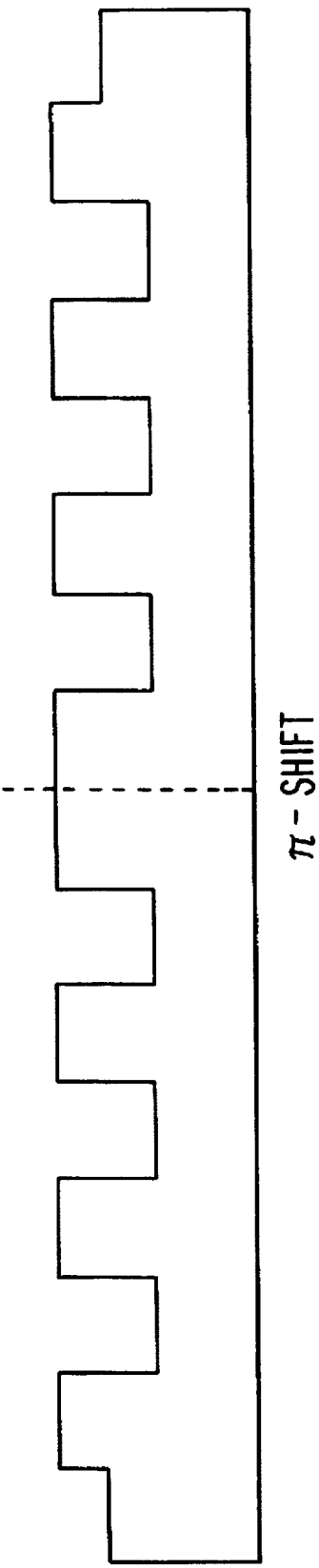

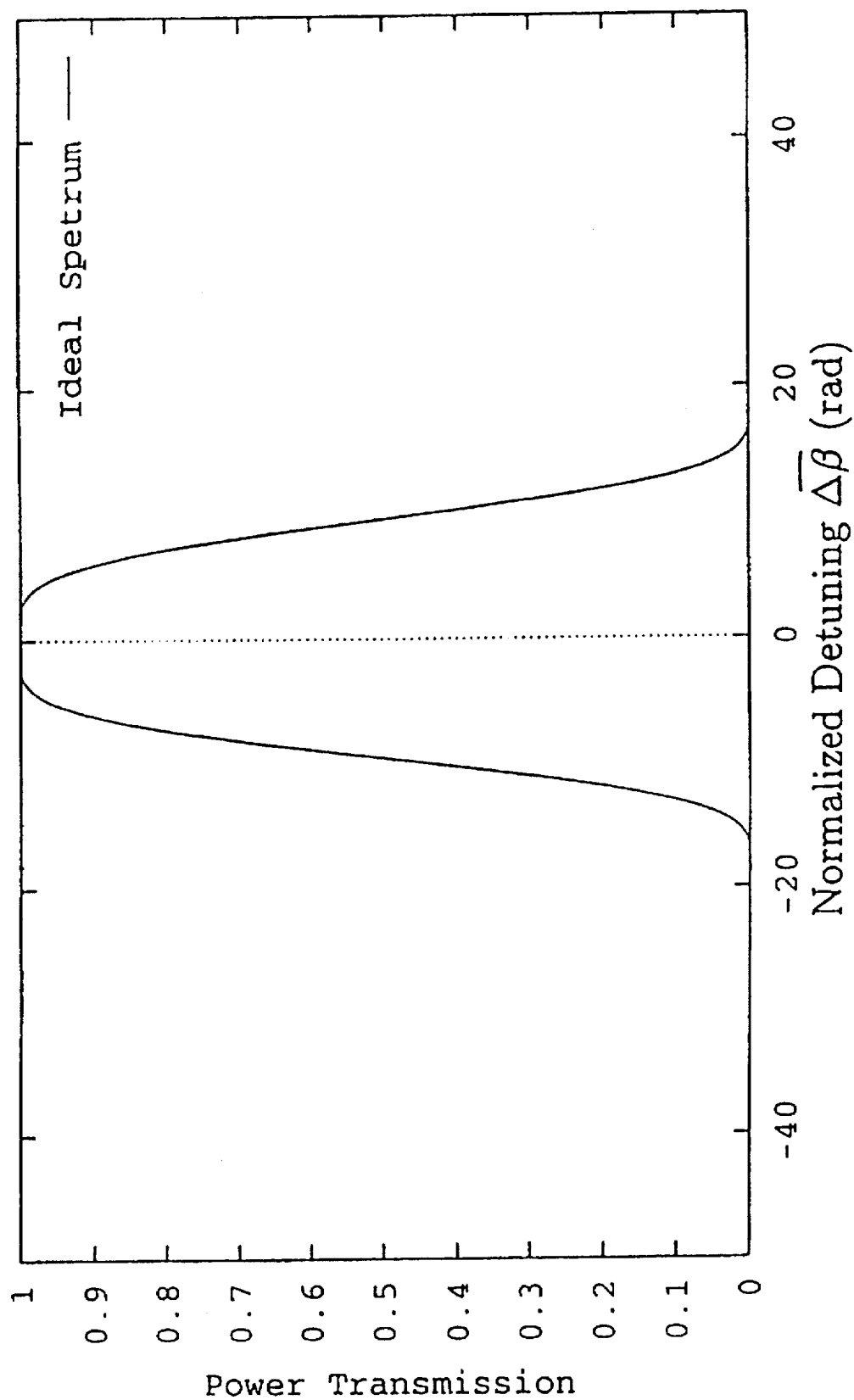

ns
5,710,849

TAPER SHAPES FOR FLATBAND RESPONSE AND SIDELOBE SUPPRESSION IN GRATING ASSISTED OPTICAL COUPLER FILTERS

FIELD OF INVENTION

This invention relates to a grating assisted optical coupler filter, and more particularly to taper shapes for flatband response and sidelobe suppression in a grating assisted optical coupler filter.

BACKGROUND OF THE INVENTION

The potential communication capacity of optical fibers operating in the low loss wavelength windows of 1.3 µm and 1.5 µm is in the order of tens of Terahertz. The practical utilization of this bandwidth may be realized through the use of wavelength division multiplexing (WDM), in which the spectral range is subdivided and allocated to different carrier wavelengths (channels) which are multiplexed onto the same fiber. The frequency bandwidth that an individual channel occupies depends on a number of factors, including the impressed modulation bandwidth, margins to accommodate for carrier frequency drift, carrier frequency uncertainty, and to reduce cross-talk between channels.

Although an isolated optical fiber may inherently have tremendous information carrying capacity, the overall optical communication link may be significantly restricted in bandwidth. These restrictions may result from the limited optical amplifier spectral windows, the availability of lasing sources and limitations on their tuning ranges, and filter tuning ranges. Hence, to achieve efficient use of bandwidth requires that the available communications windows be densely filled with multiplexed channels. At the input and output of such a system, filters are needed to combine and separate wavelengths in individual channels. The performance of these wavelength selective filters, in their ability to filter one channel and reject out of band signals, is critical in determining channel spacing and hence channel density for WDM communications.

An ideal filter response is a "box" or "window" function, characterized by unity filtering of the wavelength band of interest, and zero transmission of signals outside of the band. The bandwidth of each channel ideally is made as narrow as possible, to accommodate a larger number of channels.

One method employed for wavelength filtering takes advantage of the frequency dependent exchange of power between two waveguide modes. It is well known that two waveguides placed in close proximity may exchange power through their evanescent fields, which penetrate the guiding layer of the other waveguide. This power exchange occurs continuously along the propagation direction, with a rate determined by the inter-waveguide spacing, and the degree of velocity matching of the two modes.

For co-directional couplers comprising two parallel waveguides, and for the case of a uniform coupling coefficient along the interaction length, the transfer function is approximately given by a $[\sin(x)/x]^2$ function, with symmetric first sidelobes of −9 dB. This level of sidelobe suppression allows for significant cross talk between channels and provides unacceptable wavelength selectivity for current communications applications.

Codirectional couplers have been modeled conventionally through a set of coupled mode differential equations written in general form, i.e.:

$$\frac{dA_1}{dz} = -jKe^{-j\Delta\beta z}A_2 \qquad \text{Equation (1a)}$$

$$\frac{dA_2}{dz} = -jKe^{j\Delta\beta z}A_1 \qquad \text{Equation (1b)}$$

where $A_1$ and $A_2$ represent the amplitudes of the two waveguide modes at position z in the coupler. $\Delta\beta$ is the detuning constant and K is the coupling strength. K depends on the waveguide structure and is strongly influenced by the separation of adjacent waveguides. The origin of coupling may be due to interaction of evanescent fields in a codirectional coupler. By varying the interaction strength K along the coupler the spectral response of the device can be improved. Thus by a suitable choice of function K(z) it is theoretically possible to generate a desired filter response. The calculation of the taper shape required for a desired response has been a long-standing design question.

The goal of filter synthesis is to solve for the coupling function K(z) given a desired response for $A_1$ and $A_2$. However, when K(z) is non-constant, the set of coupled equations (1a) and (1b) has no analytic solution in general. Hence, filter design is currently guided by a set of approximate solutions.

The most important of these approximate solutions is obtained by the Fourier transform relation, given by:

$$A_2(\Delta\beta) \sim \int K(z)e^{-j\Delta\beta \cdot z}dz \qquad \text{Equation (2)}$$

In Equation (2), $A_2(\Delta\beta)$ is the amplitude in the output or coupled waveguide as a function of detuning $\Delta\beta$, (which may be related to the actual wavelength $\lambda$). Because Equation (2) represents a Fourier transform relation between K(z) in the spatial domain and $A_2(\Delta\beta)$ in the wavelength domain, the principle of duality may be used. That is, given a desired $A_2(\Delta\beta)$, K(z) is found by the inverse Fourier transform. This approximation is valid for small coupling values, and does not extend to describe the critical region of the main passband and first few sidelobes. No analytic solution currently treats the important region around the central wavelength.

For example, in an original proposal based on an approximate Fourier transform relation, described by Alferness et al., in IEEE J. Quantum Electronics QE 14 (11) pp. 843–847, November 1978, improved optical waveguide directional couplers were suggested for which the coupling strength is weighted, or tapered, along the interaction length by several known taper functions. Thus, for example, in two co-directional waveguides, the inter-guide separation may be varied along the interaction length to vary the interaction strength. In an article in Appl. Phys. Letters 35 (3), pp. 260–263, 1Aug. 1979, Alferness demonstrated experimentally the feasibility of using weighted coupling to reduce sidelobes of the filter transfer response, allowing for closer stacking of wavelength channels with reduced cross talk by use of various taper profiles. In particular, a Hamming taper function was found to provide a codirectional filter with −25 dB transfer response sidelobes, a significant improvement over other known taper functions, for example, a raised cosine function, Blackman taper, and Kaiser taper function known at that time.

On the other hand, inverse scattering methods are mathematically rigorous and have recently been applied to obtain near filter response functions as described, for example, in an article by Song and Shin, entitled "Design of corrugated waveguide filters by the Gel'fand a-Levitan-Marchenko inverse scattering method", in J. Opt. Soc. Am. A. Vol. 2 (11)

November 1985, and an article by K A Winick, entitled "Design of grating assisted waveguide couplers with weighted coupling" in J. Lightwave Technology, vol. 9 (11) November 1991.

Given a desired response $A_2(\Delta\beta)$, the inverse scattering method attempts to numerically solve the coupled mode equations in an inverse sense, thus yielding the desired interaction function K(z). The success of the inversion depends on being able to specify the desired response as a rational function, and is therefore limited to those functions which fall under this category. Moreover, the interaction strength solution is defined on the entire z axis $\{-\infty<z<\infty\}$. Thus one must arbitrarily truncate the range of K(z) to get a coupler of finite length. This truncation can seriously degrade performance, as discussed in an article of Song et al., entitled "Design of corrugated waveguide filters by the Gel'fand-Levitan-Machenko inverse scattering method," in J. Opt. Soc. Am. A. Vol. 2 (11), pp. 1905–1915, 1985.

The inverse scattering method does not yield any guidelines on how to obtain the desired response in a coupler with a specified and finite length. Thus, it can never, in a rigorous sense, yield an ideal solution of K(z) for a practical device. Indeed, no known finite taper function K(z) has yet been shown to meet the required optical communication specifications. Thus alternative approaches are required for filter design.

Consequently, as described in the above-mentioned co-pending U.S. patent application Ser. No. 08/385,419 to the current inventors, entitled "Taper shapes for ultra-low sidelobe levels in directional coupler filters", a novel approach to filter design was developed based on a variational optimization theory. This method has also been described in part by the inventors in Optics Letters, vol. 20 (11) p.p. 1259–1261, 1Jun. 1995. By this approach, a new class of coupler shape functions was synthesized and their application was demonstrated in deriving taper functions for co-directional coupler filters, in which:

$$k(z)=L_0(z)+SL_1(z)+S^2L_2(z)+S^3L_3(z)+S^4L_4(z) \quad \text{Equation (3)}$$

where k(z) is the normalized interactions strength, S is the desired sidelobe level, and where the functions $L_i$ are given by:

$$L_i(z) = \sum_{j=1}^{6} b_{i,j}\cos((2j-1)\pi z) \quad (-0.5<z<0.5) \quad \text{Equation (4)}$$

and where, for a real physical device, the physical length scales as $Z=zL_c$, where Z is the physical length, z is the normalized length, and $L_c$ is the length of the interaction region of the device. Thus $L_i$ are functions of the propagation distance z only. A set of coefficients $b_{i,j}$ were determined for optimized filter response functions, and it was demonstrated that sidelobe suppression of the transfer function from −40 dB to −75 dB, with bandwidths within 5% of the theoretical minimum bandwidths, may be obtained for co-directional couplers.

In another copending U.S. patent application filed concurrently herewith by two of the present inventors, entitled, "Taper shapes for sidelobe suppression and bandwidth minimization in distributed feedback optical reflection filters", a similar approach was used to synthesize optimized taper shapes for DFB optical reflection filters. These filter characteristics were determined by specifying the interaction strength function along the length of the coupler, by the design formula $$K_S(z)=L_0(z)+SL_1(z)+S^2L_2(z)+S^3L_3(z)$$

where $K_S(z)$ is the interaction strength; S is the desired sidelobe level in |dB|, $L_i(z)$ (i=0,1,2,3) are functions of the propagation distance z.

The functions $L_i(z)$ are given by:

$$L_i(z) = \frac{1}{L_c}\sum_{j=1}^{6} b_{i,j}\cos\left((2j-1)\pi\frac{z}{L_c}\right)$$

where $L_c$ is the physical length of the coupler, and a set of constant coefficients $b_{i,j}$ were determined to provide optimized filter response functions.

Another type of coupled waveguide filters are known as grating assisted codirectional couplers. In these devices, power exchange occurs due to coherent scattering of a periodic grating placed in proximity to the two waveguides. In an article by Sakata, on wavelength selective grating assisted couplers, in Optics Letters, Vol. 17 (7) 1 Apr. 1992 pp. 463–465, improved sidelobe suppression was obtained by controlling the duty ratio of grating assisted vertically coupled waveguides, using a truncated Gaussian taper function. Sidelobe suppression in grating assisted wavelength selective couplers of Sakata showed that required grating periods were sufficiently coarse (~µm) to allow for fabrication by known conventional photolithography and etching process. For example, it was shown that a Hamming taper offered narrower bandwidth spacing, while a Kaiser taper provided improved sidelobe suppression below −60 dB in these devices. Thus, in comparing the Hamming, Blackman, Kaiser, and truncated Gaussian taper functions, the trade off between multiplexing density and cross-talk level was apparent.

Nevertheless, currently known taper shapes are unable to provide a specified level of sidelobe suppression with a near optimum flattened bandpass, with near unity transmission for gratings assisted filter couplers.

SUMMARY OF THE INVENTION

Thus the present invention seeks to provide an grating assisted optical filter coupler with improved passband response and sidelobe suppression.

One aspect of the present invention provides a grating-assisted filter coupler comprising: a first waveguide for receiving an optical signal having at least one predetermined wavelength, a second waveguide in a spaced relationship to the first waveguide so that said predetermined wavelength is selectively coupled to from the first waveguide to the second waveguide, the coupling between first and second waveguides being tailored by a taper function defining the interaction strength given by $$K_1(z)=A_1e^{-\alpha_1(z-z_1)^2}+A_2e^{-\alpha_2(z-z_2)^2}+A_3e^{-\alpha_3(z-z_3)^2} \quad 0<z<1$$

where $K_1(z)$ is the normalized interaction strength along the propagation direction. Sets of constant coefficients $A_1$, $A_2$, $A_3$; $\alpha_1$, $\alpha_2$, $\alpha_3$; $z_1$, $z_2$, $z_3$ are determined to provide a specific level of sidelobe suppression and passband response.

Thus an improved taper function in an analytic form is provided for optimization of sidelobe suppression ratio and improved passband response. In particular, this approach to filter synthesis provides for a specified level of sidelobe suppression with an optimized passband response that is flat and has a transmission of greater than 99.55% of the transmission at the passband centre, over a wavelength range of 25% of the half-power bandwidth.

For example, constant coefficients are determined to provide an out-of-band sidelobe suppression ratio of greater than −30 dB, and a passband response that is flat and has a transmission of greater than 99.55% of the transmission at the passband centre, over a wavelength range of 25% of the half-power bandwidth. The constant coefficients providing the above characteristics were determined to be:

$A_1=8.774$; $A_2=-3.45$; $A_3=1.183$;
$\alpha_1=51.87$; $\alpha_2=34.49$; $\alpha_3=20.63$;
$z_1=0.28$; $z_2=0.60$; $z_3=0.75$.

where z is the normalized distance and is related to the physical distance $Z=zL_c$, where $L_c$ is the coupler length. Thus the interaction strength is determined for a coupler of an arbitrary finite length. These coefficients represent the optimized taper function to provide the specified filter response, but it is understood that small variations of these coefficients in practical devices will provide slightly less than optimized coupling. Correspondingly, other sets of coefficients may be determined by the variational optimization method described herein to provide other specified filter response characteristics.

In practical implementations of a grating assisted filter coupler, the specified interaction strength may be produced by modulating a physical parameter, e.g. the space relationship between two waveguides as a function of Z. Alternatively, other physical parameters of the grating assisted coupler may be varied to provided the required interaction strength. For example by the required interaction strength is provided by refractive index contrast modulation of the grating as a function of Z; by defining the duty cycle of the modulating grating as a function of Z; by defining the height of a surface corrugation grating as a function of Z; by defining the width of the grating regions as a function of Z; by defining the ridge width of coupled ridge waveguides as a function of Z.

BRIEF DESCRIPTION THE DRAWINGS

Embodiments of the invention will now be described by way of example, with reference to the accompanying drawings, in which:

FIGS. 1a, 1b, and 1c show 3 known types of grating-assisted co-directional coupler.

Figure 5:
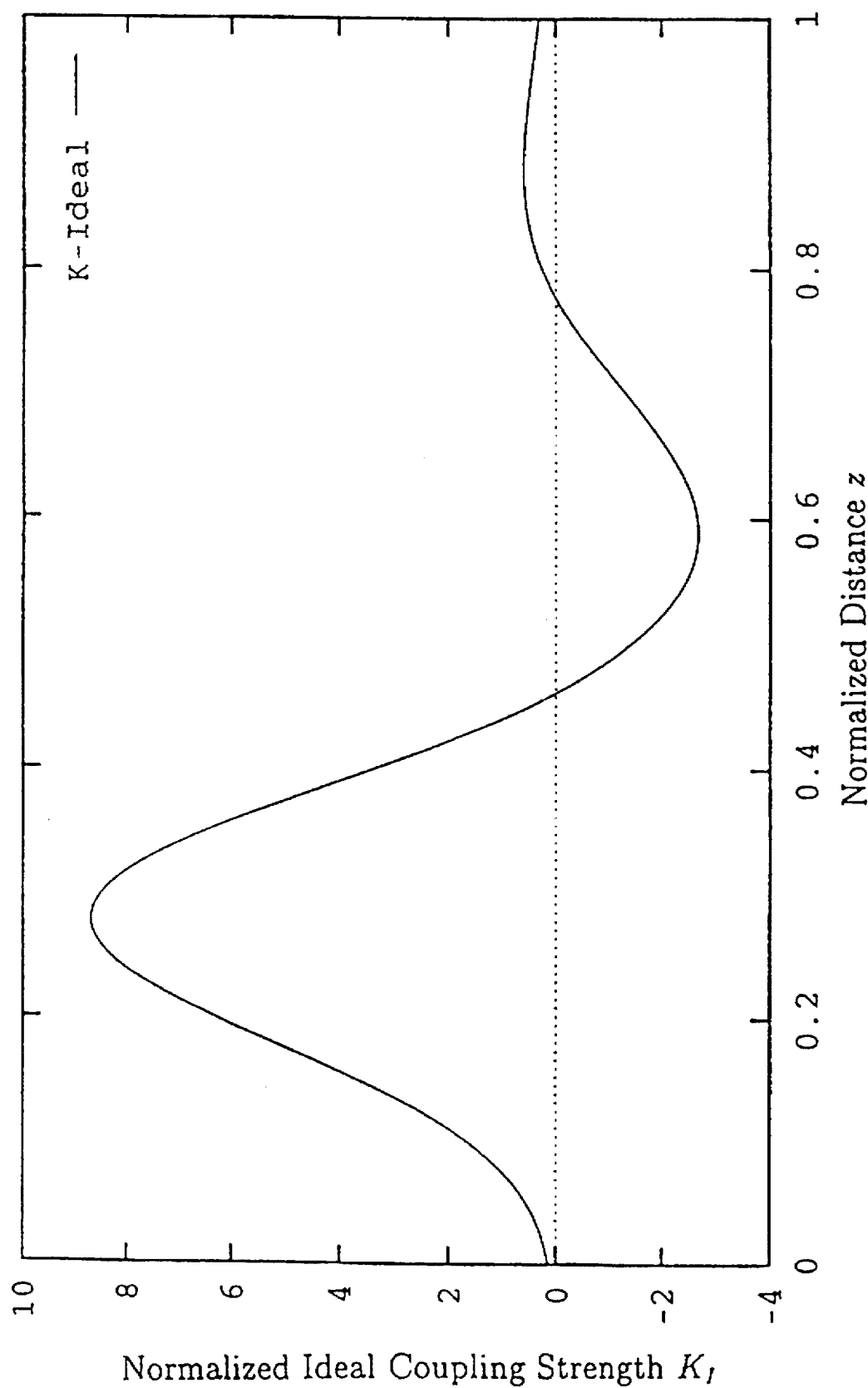
Figure 7B:
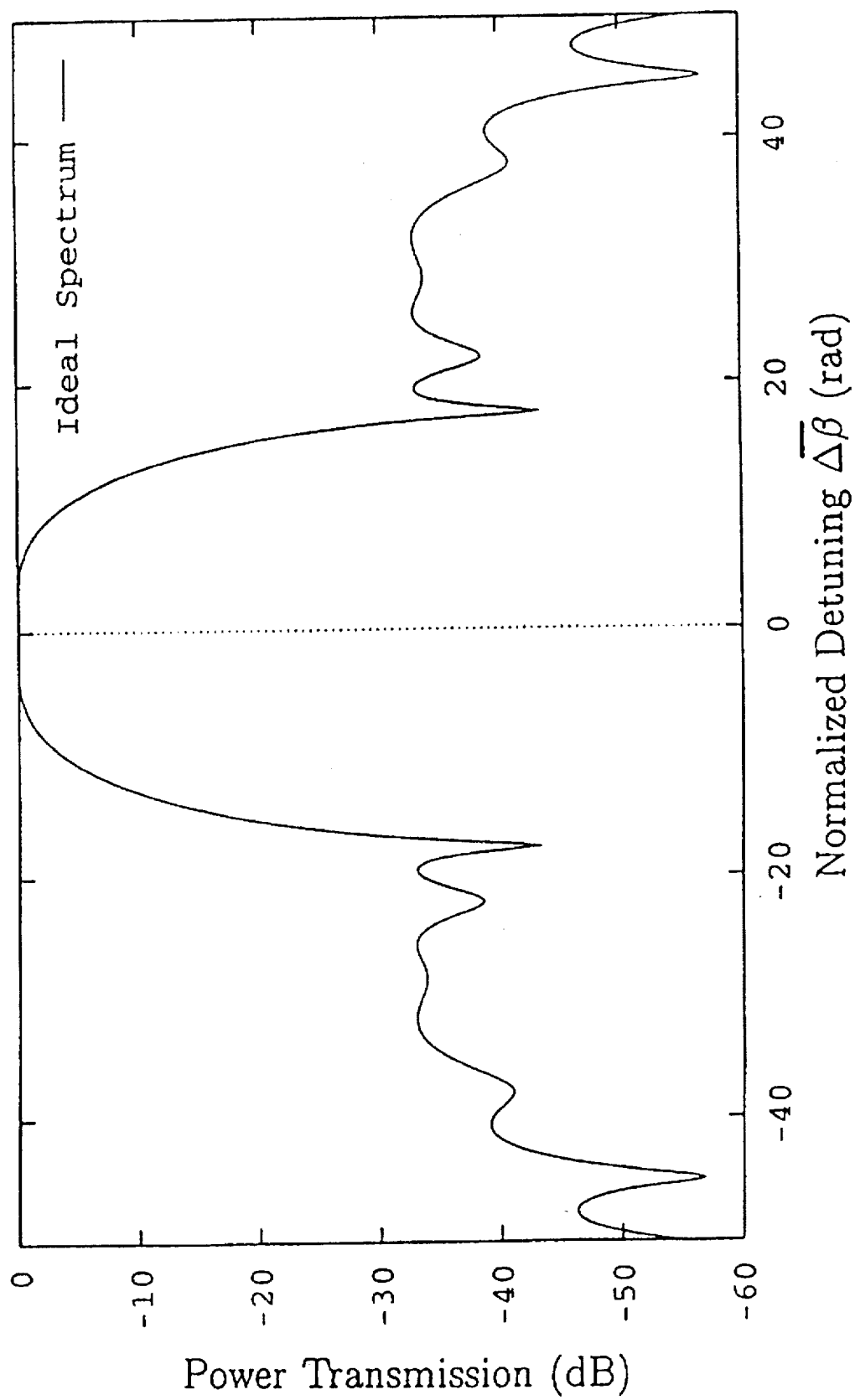
Figure 8A:
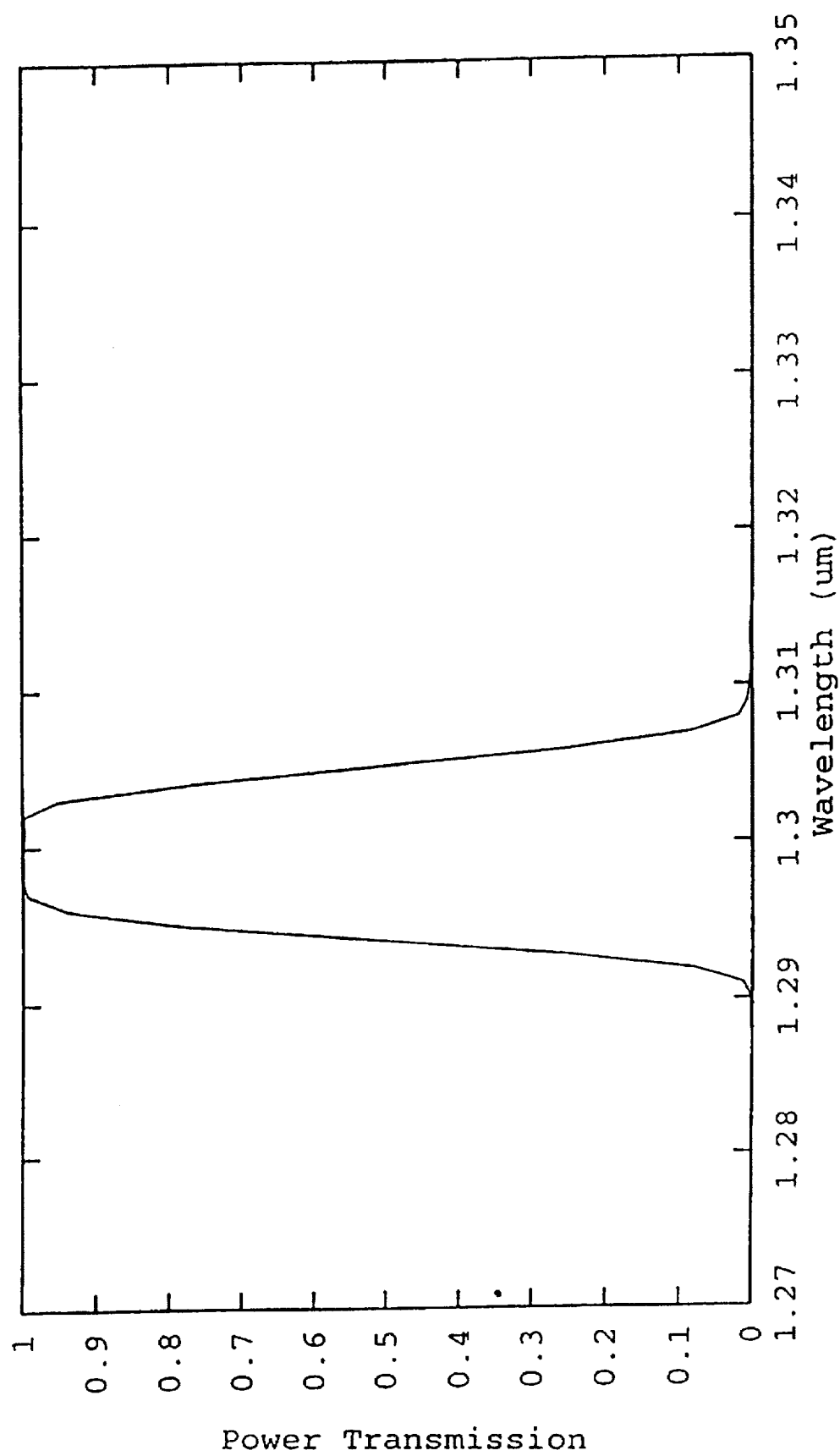
Figure 8B:
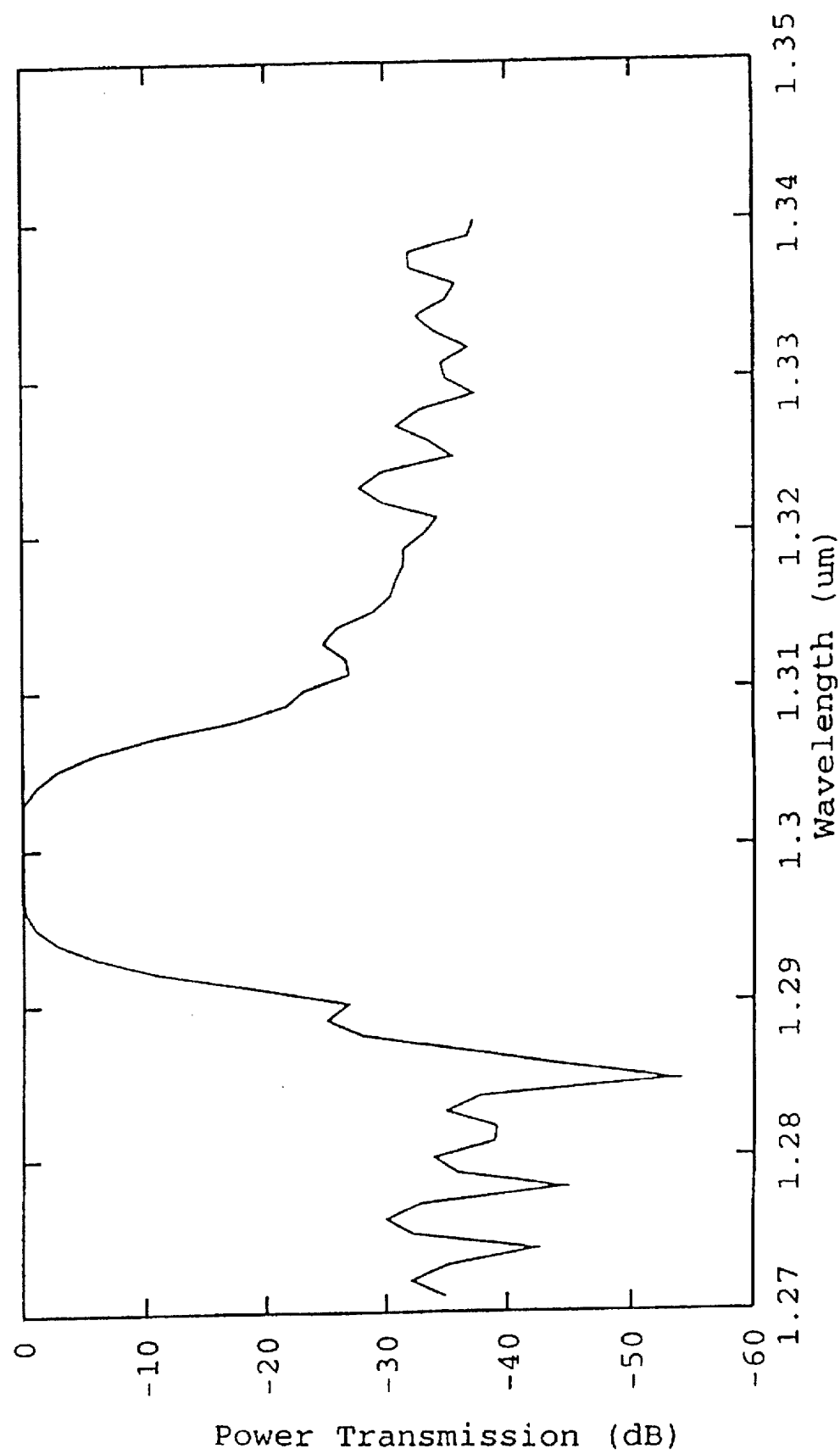
Figure 9:
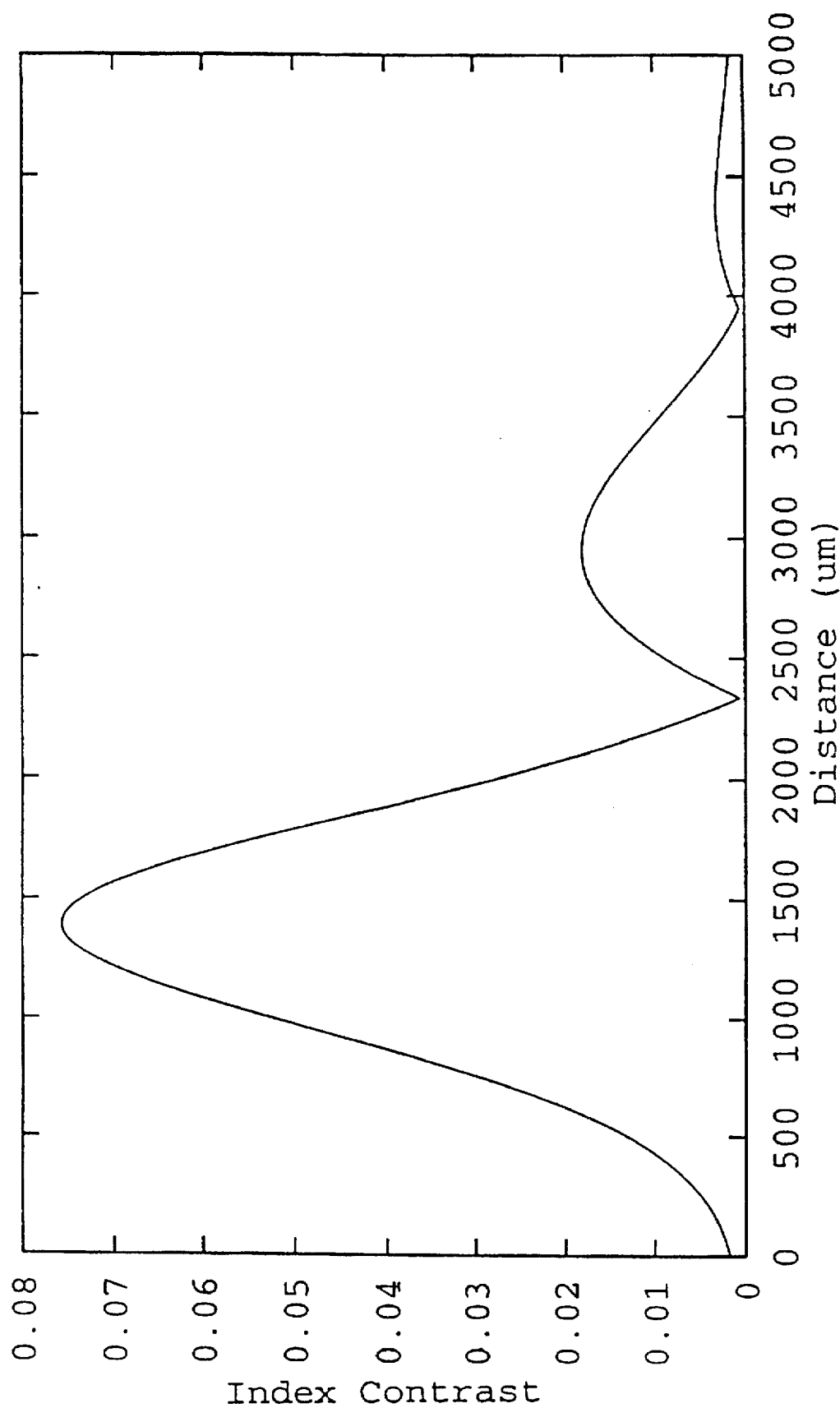
Figure 10A:
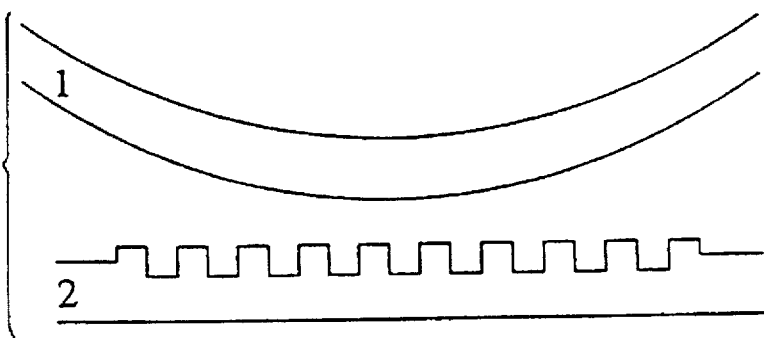
Figure 10B:
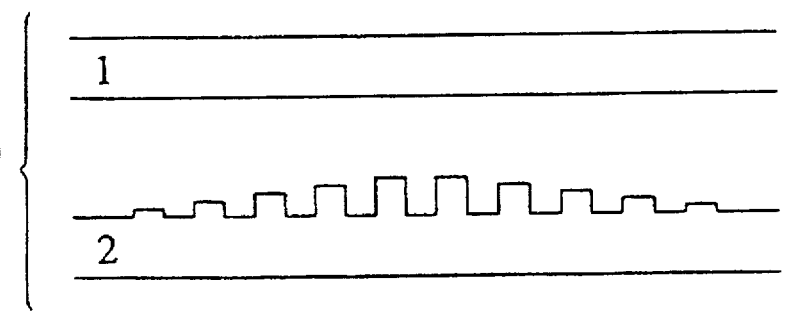
Figure 10C:
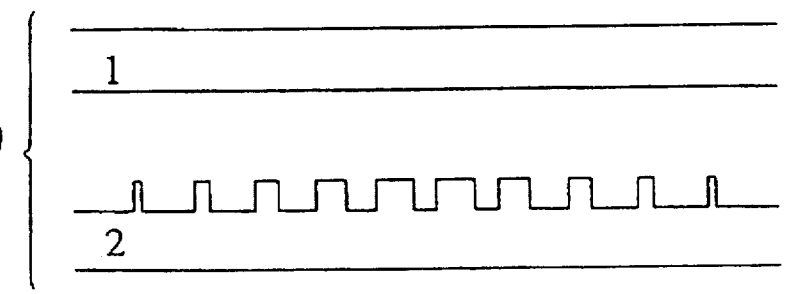
Figure 10D:
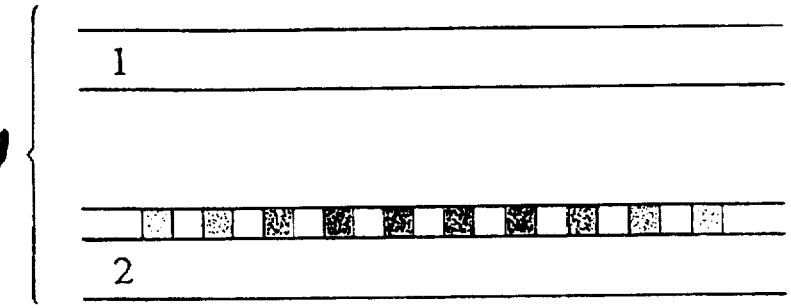
Figure 10E:
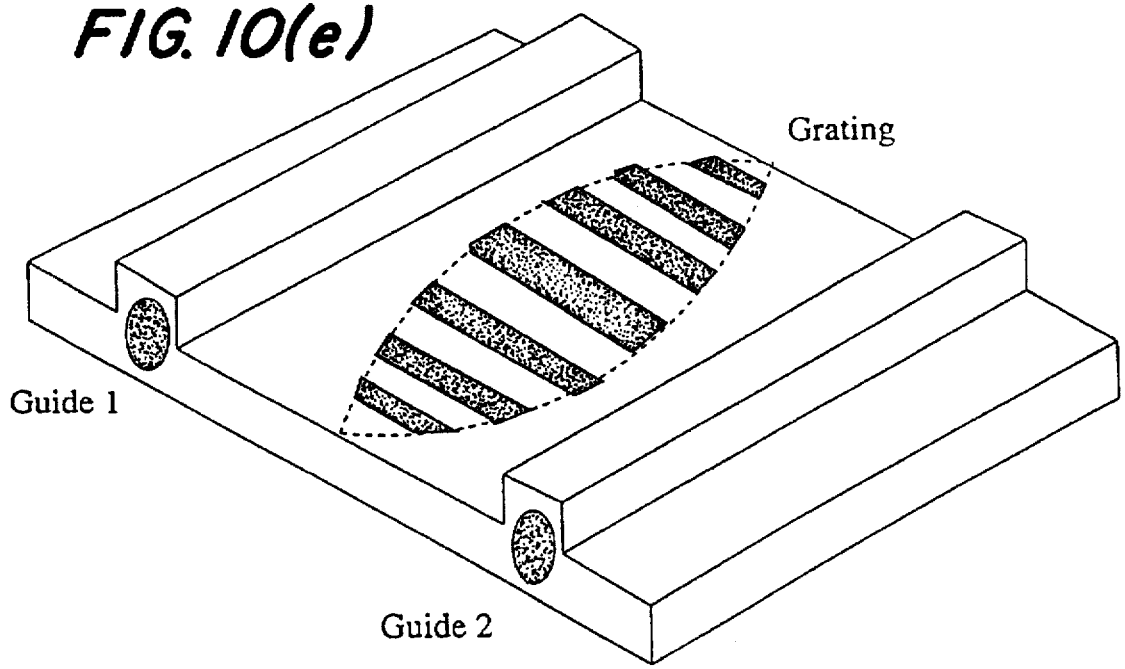
Figure 10F:
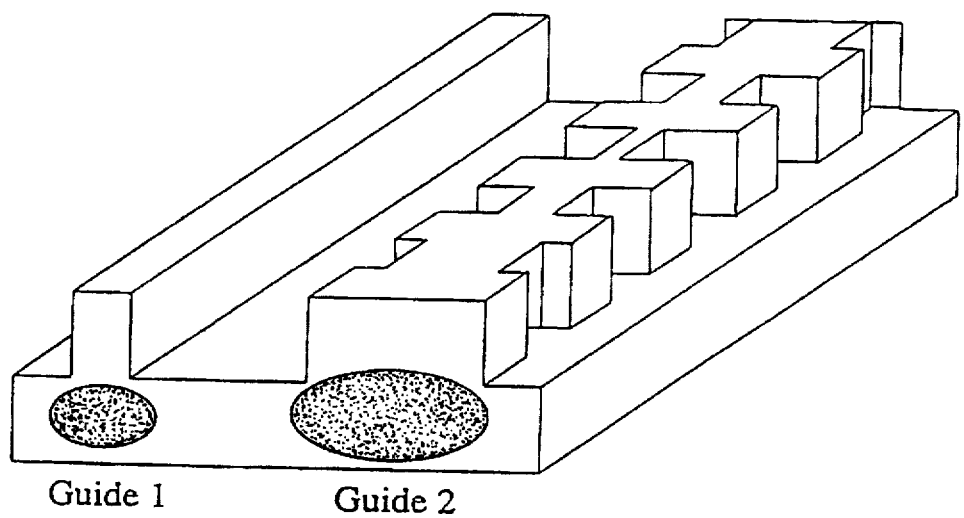

FIG. 5 shows an ideal taper shape $K_1(z)$ for a spectral response with a flat transmission passband and sidelobes suppressed to below −30 dB. The abscissa is distance along the coupler normalized to the coupler length. The ordinate is the interaction strength;

FIGS. 6a and 6b shows an implementation of a $\pi$ phase shift to change effectively the sign of the interaction strength by cascading two half period etch regions of the grating and by cascading two half period teeth of the grating, respectively;

FIGS. 7a and 7b shows the spectral response of the grating coupler designed using the ideal coupling strength $K_1(z)$. FIG. 7a shows the power transmission characteristics on a linear scale and FIG. 7b shows the power transmission characteristics on a logarithmic (dB) scale;

FIGS. 8a and 8b shows the wavelength response of a two dimensional structure simulated using the Beam Propagation Method (BPM) showing power transmission characteristics on linear and logarithmic scales respectively;

FIG. 9 shows the grating index contrast as a function of distance for the same grating coupler used in the simulation of FIG. 8, where the index contrast is defined as the difference between the higher index value and low index value of the grating;

FIG. 10a to 10d shows schematically four methods for modulating the coupling strength $K_1(z)$ by varying device parameters, i.e. FIG. 10a by varying the separation between two waveguides; FIG. 10b by varying the grating height; FIG. 10c by varying the grating duty cycle; FIG. 10d by varying the index contrast of the grating; FIGS. 10e shows a tapered substrate grating structure varying the spatial width; and FIG. 10f shows a rib waveguide grating structure varying the grating height in a horizontal direction.

DESCRIPTION OF THE PREFERRED EMBODIMENTS

Examples of three known types of grating-assisted couplers are shown in schematically in FIGS. 1a, 1b and 1c. The first is a vertical waveguide coupler in which the waveguides are placed one on top of the other, one in the substrate layers, and an overlying rib having a vertical corrugation grating is defined on the top surface of the rib (FIG. 1a). One form of rib waveguide coupler comprises two rib waveguides side by side, with a vertical corrugation grating defined on the top surface of one of the ribs (FIG. 1b). Another form of rib waveguide coupler comprises gratings defined along sides of one of the rib waveguides (FIG. 1c).

Figure 1:
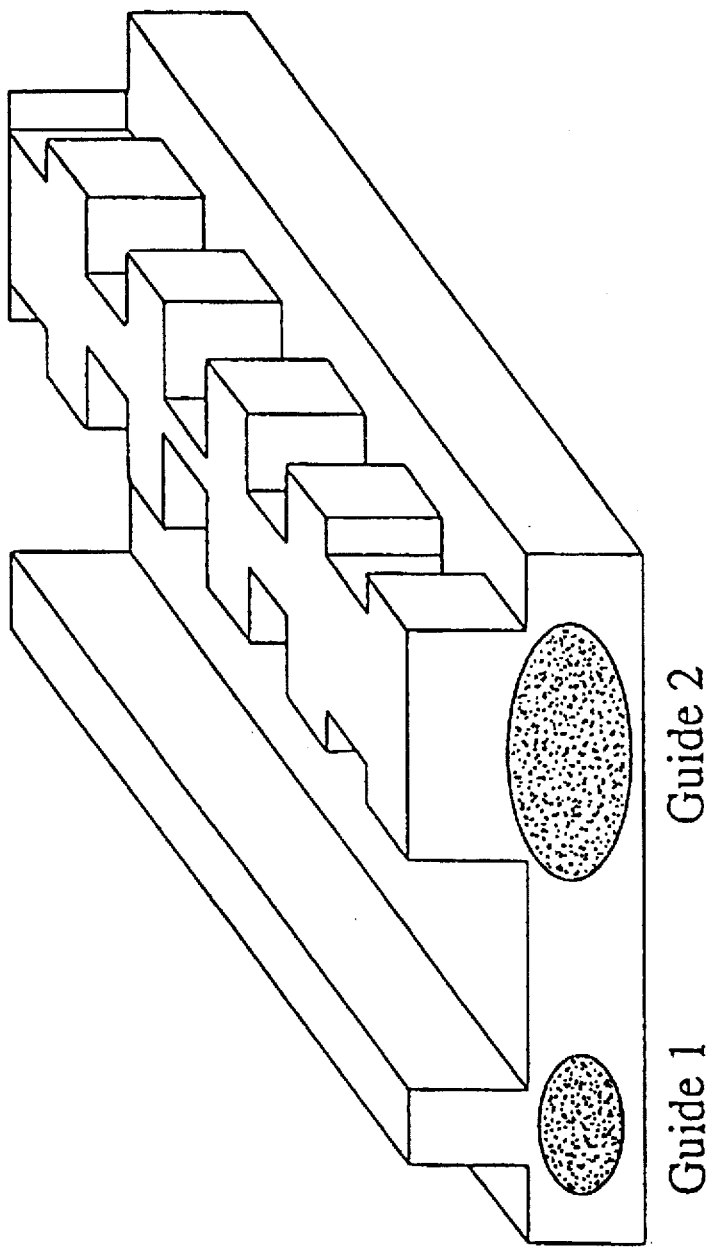
Figure 2:
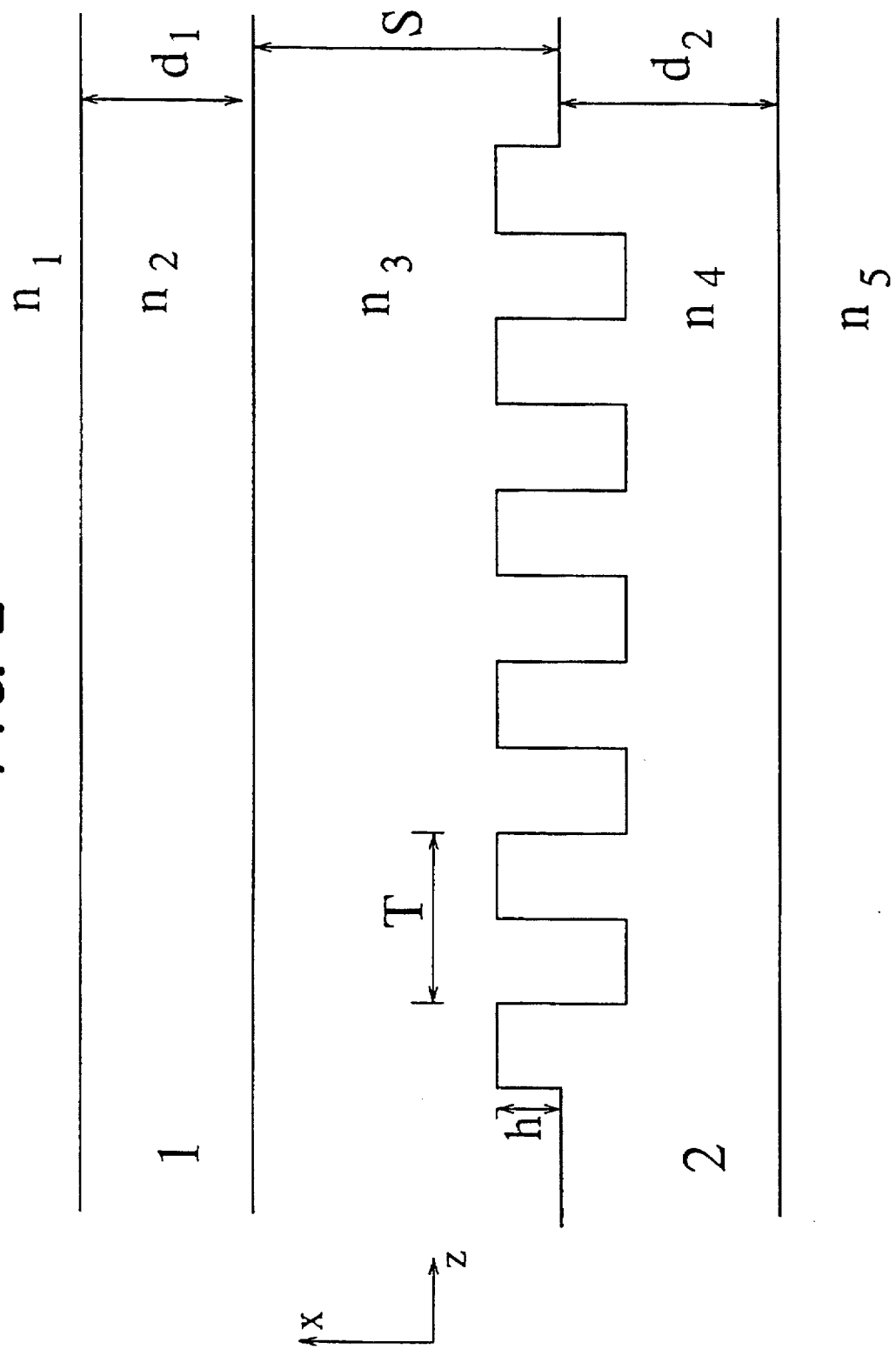
FIG. 2 shows a two-dimensional schematic representation of a generalized grating-assisted co-directional coupler.

In the following descriptions, 3 dimensional grating couplers, e.g. as shown in FIGS. 1a–1c will be represented schematically in two dimensions as shown in FIG. 2. Referring to FIG. 2, the input is initially into waveguide 1, the "input guide", and the filtered output is extracted from waveguide 2 (the "coupled" guide).

Waveguides 1 and 2 are not identical since the grating is used to "match" them, which improves wavelength selectivity. The grating may be a corrugation of a boundary surface as shown in FIG. 2. Alternatively, the grating may be created by a modulation of the index of refraction of one or more index layers, i.e. by varying the material composition of the layers, or by ion implantation. $d_1$ and $d_2$ are the widths of waveguides 1 and 2; s is the separation of the two waveguides, edge to edge; T is the grating period and h is the half height of the grating for a surface corrugation type of grating. $n_1$, $n_2$, $n_3$, $n_4$, $n_5$ are the refractive indices of each layer, respectively.

Power exchange occurs continuously along the propagation direction of the couplers of FIGS. 1 and 2. The rate of power exchange depends on the inter waveguide spacing and the strength of the grating, i.e. its modulation depth and index contrast. The degree of power exchange that occurs between the coupled waveguides is determined by the grating period, which is denoted by T, in FIG. 2. The grating period is selected to match the phase velocities of the modes in two waveguides at a specified 'central' wavelength $\lambda_0$. At this central wavelength, the situation is termed 'synchronous' or 'phase-matched', and 100% of the power may be transferred from the input waveguide to the coupled waveguide at a characteristic coupling length $L_c$. At other wavelengths the difference of phase velocities of the two modes are not matched by the grating period, and the situation is called 'asynchronous' or 'non phase-matched'. Then, the power scattered by the grating into the coupled waveguide does not accumulate constructively, and complete power exchange in this case is not possible. Typically, the further a wavelength is from a central wavelength, the greater the phase mismatch becomes, resulting in a decreasing level of power transferred to the coupled waveguide. This effect provides wavelength selectivity to the coupler.

Figure 3:
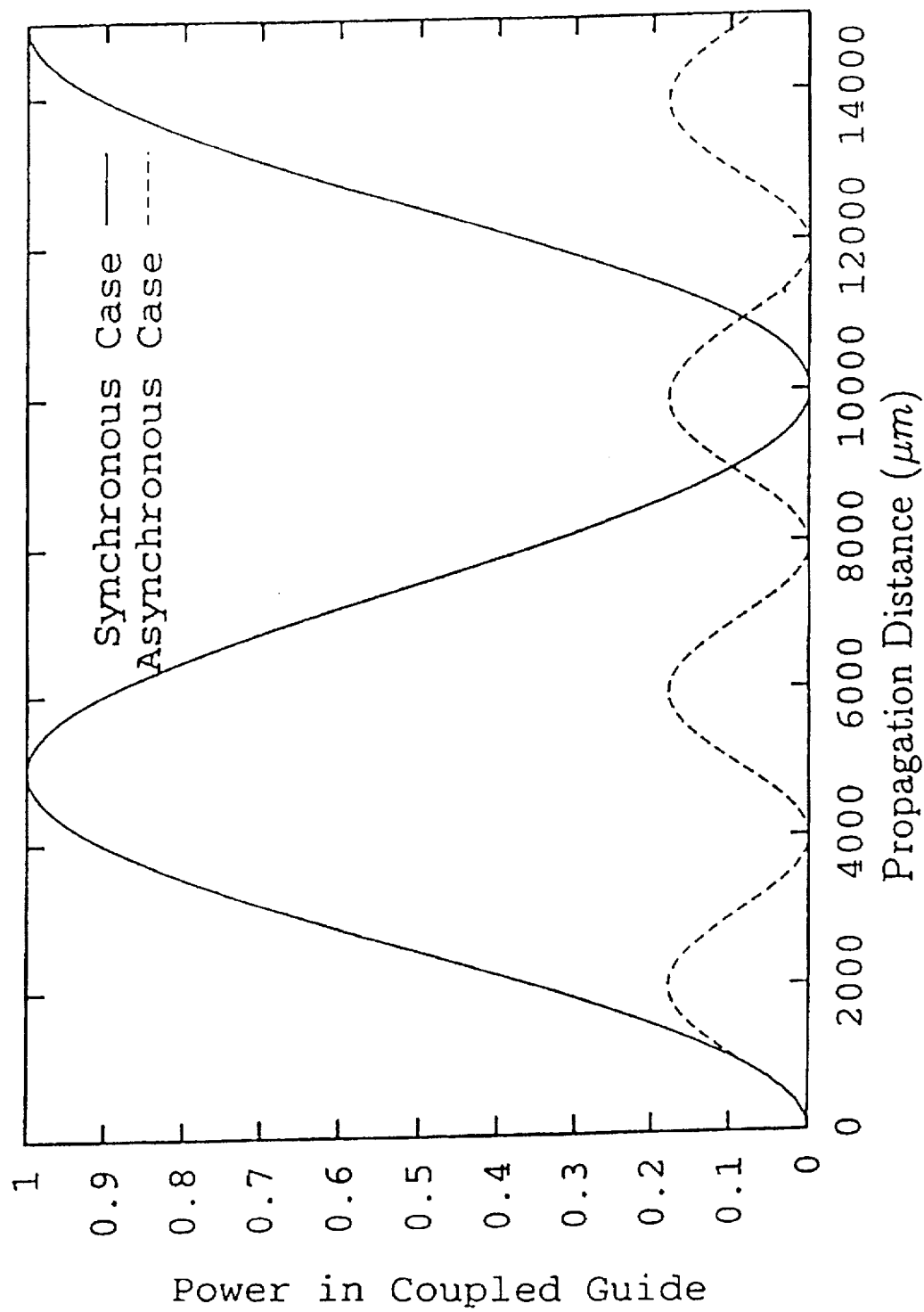
FIG. 3 shows the power in the coupled waveguide as a function of propagation distance.

The power in a coupled waveguide as a function of the device length, for the two cases of phase matching, is shown in FIG. 3. The solid curve represents a synchronous case where the grating period exactly matches the phase velocities of the two modes. Complete power exchange occurs at a coupling length of $L_c$=5 mm. The dashed curve represents coupling at a wavelength away from synchronism.

Wavelength Selectivity and Spectral Characteristics of the Grating-Assisted Coupler.

Wavelength selectivity in the grating assisted codirectional coupler occurs through differential velocity dispersion. At the central design wavelength the velocities of the two modes are exactly matched by the grating period. As the wavelength is changed or detuned, the mode velocities necessarily change. For filtering action, it is critical that the difference between these mode velocities change, i.e. a differential velocity dispersion is required.

The rate of change of differential velocity with respect to wavelength is the primary factor in determining filter bandwidth. This rate is a function of material type and waveguide structure.

Figure 4A:
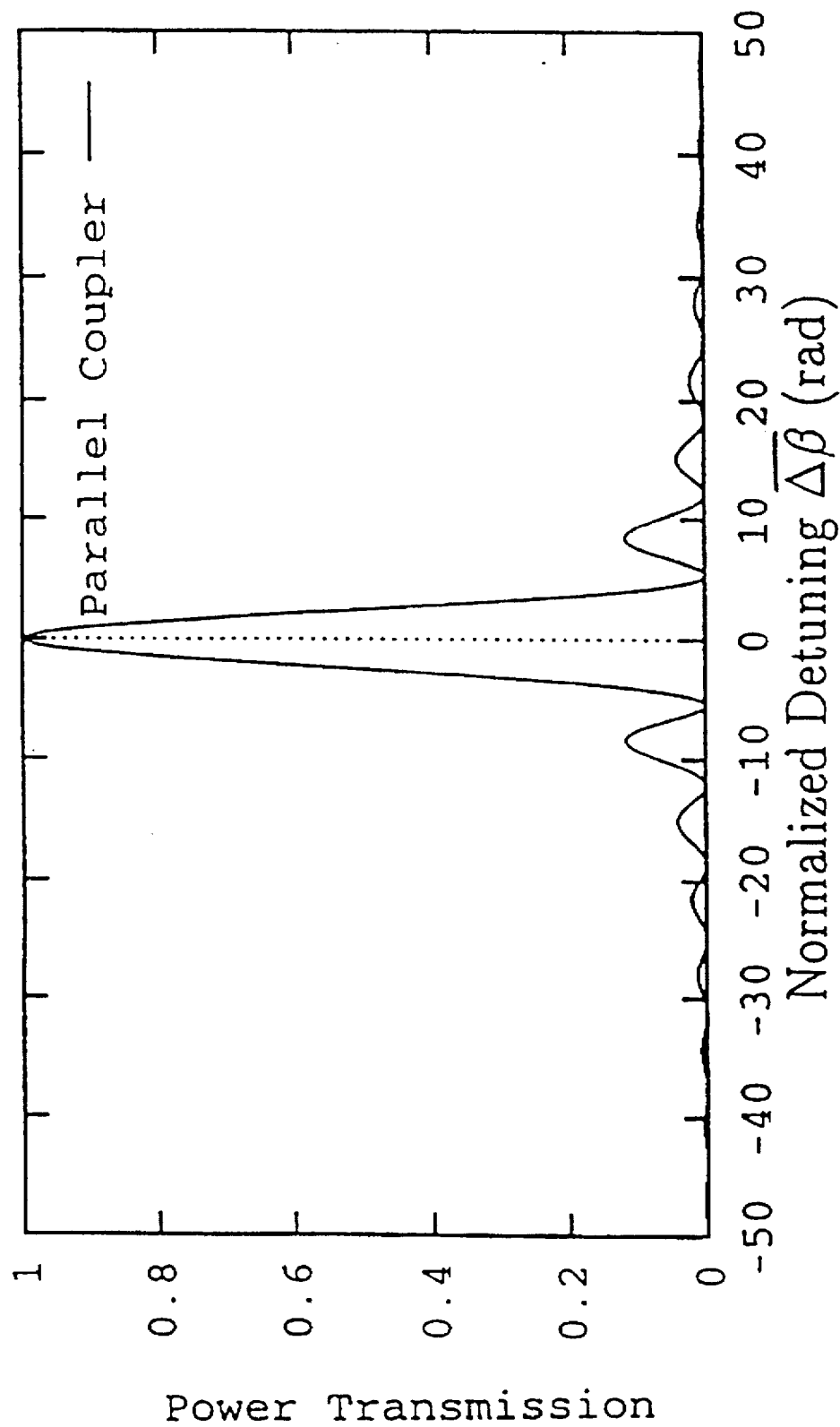
FIGS. 4a and 4b show the spectral response of a typical known grating-assisted co-directional coupler on a linear and logarithmic scale (dB) respectively.
Figure 4B:
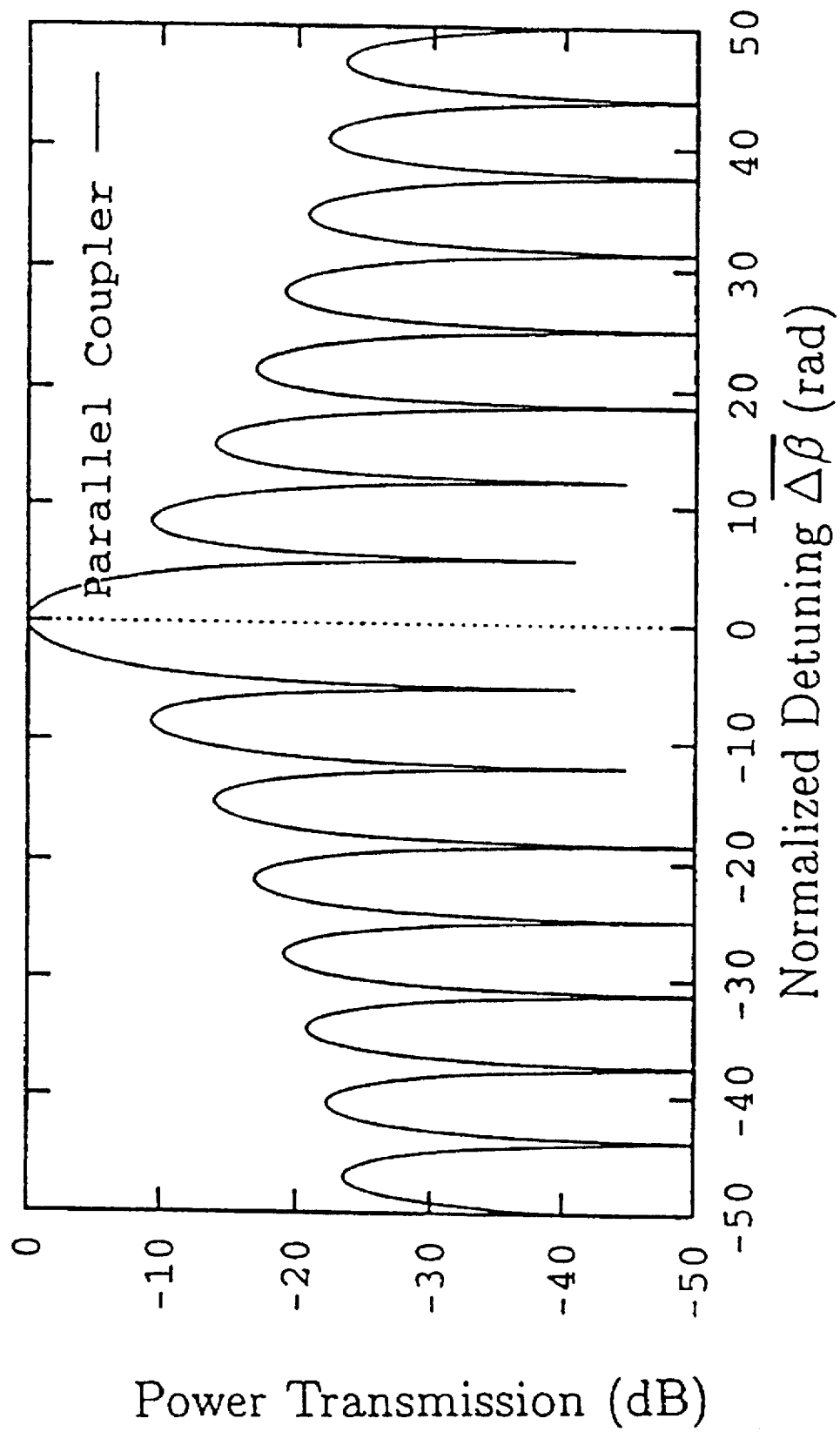

FIGS. 4a and 4b show the filter response of a typical known parallel grating assisted co-directional coupler, see FIG. 2. FIG. 4a shows the power transmission characteristics in a linear scale while FIG. 4b shows the same response on a logarithmic scale. The abscissa $\overline{\Delta\beta}$ of FIGS. 4a and 4b are in normalized detuning units of radians (rad) which is a measure of the velocity difference between the coupled modes and the grating spatial frequency. This axis can be converted into an actual wavelength scale when the relationship between $\overline{\Delta\beta}=\Delta\beta \cdot L_c$ and the wavelength $\lambda$ is established for a particular device.

The ordinate in FIG. 4b is the power in the coupled waveguide, in logarithmic scale (dB). The half-power bandwidth is defined as the wavelength range at which the power transmission response falls to one half of its value at the central wavelength. In normalized units, the half-power bandwidth is 8.4 radians for the spectrum in FIG. 4b. The maximum, i.e. first, sidelobe level in FIG. 4b is −9.3 dB.

As mentioned above, for optical communications purposes, a sidelobe level of −9.3 dB is too large, since it would represent a significant cross-talk to an adjacent wavelength channel, if these channels were spaced by the width of the passband. If it is required that the cross talk in an adjacent channel be less than −9.3 dB, the spacing between adjacent channels in the wavelength domain must be made much larger than the main passband width. Since the sidelobe levels decrease at a slow rate with detuning (see FIG. 4b), the channels must be widely separated. Hence, a severe penalty is paid in terms of channel density, and hence information carrying capacity, for the price of low crosstalk.

In addition to the relatively high sidelobes, complete power exchange only occurs at the central wavelength in the parallel coupler configuration. The ideal 'box-like' filter should have complete power exchange over a range of wavelengths, that is have a 'flat' or near unity passband response. This flat type of response is required in order to completely filter the desired signal channel without incurring any attenuation, as well as to accommodate an uncertainty in the precise wavelength of the carrier, and to accommodate drifting of the carrier wavelength. Thus, it is very desirable to identify some degree of freedom, that is a parameter of the device, which may be used to improve filter response, and approach the ideal box like response.

The degree of freedom most commonly used in grating assisted codirectional couplers is the modulation of the interaction strength of the two coupled waveguides, which may be achieved for example, by modulating a physical parameter of the grating. This may be achieved by (i) modulating the inter-waveguide separation between coupled waveguides; (ii) by adjusting the height (or modulation depth) of the grating; (iii) by adjusting the duty cycle of the grating period; (iv) by modulating the refractive index contrast of the grating and the surrounding material; (v) by adjusting the width of the grating region; (vi) by adjusting the ridge width of the ridged waveguide that carries the grating. The practical implementation of these six methods will be outlined in the second below entitled "Practical implementation of coupling strength tapering". In many other branches of optics and physics this process is known as 'apodization'. In waveguide theory it is referred to as 'tapering'.

Grating-assisted codirectional coupler devices are commonly modeled through a set of coupled differential equations, written in the form:

$$\frac{dA_1}{dz} = -jKe^{-j\Delta\beta z}A_2 \qquad \text{Equation (7a)}$$

$$\frac{dA_2}{dz} = -jKe^{j\Delta\beta z}A_1 \qquad \text{Equation (7b)}$$

In (1a) and (1b) $A_1$ and $A_2$ represent the amplitudes in waveguides 1 and 2. $\Delta\beta$ is the detuning constant $\Delta\beta=\beta_1-\beta_2-\Omega$, where $\Omega=2\pi/T$, $\beta_1$ and $\beta_2$ are the propagation constants of waveguides 1 and 2 respectively and K is the interaction strength. K depends on the waveguide structure and is strongly influenced by the separation between adjacent waveguides, and the grating strength. The grating period T is chosen to match the propagation constants of the modes at the central wavelength $\lambda_0$. That is $$T = \frac{2\pi}{|\beta_2(\lambda_0) - \beta_2(\lambda_0)|} \qquad \text{Equation (8)}$$

By varying the interaction strength K along the directional coupler, the spectral response of the device may be improved. The physical origin of this improvement is in the interferometric nature of the coupling process: at every position along the coupler, power is being transferred from the input waveguide to the coupled waveguide. The total power in the coupled waveguide at some point then, is an interferometric sum of all the power coupled into the waveguide prior to that point. That is, a sum including relative phase delays. By adjusting the interaction strength K along the waveguide, one dictates the rate of power transfer at each position, along with its phase relationship to the total coupled power. By judicious choice of the coupling taper shape K(z), it is theoretically possible to generate any (passive) response.

In the following section we present the details of a variational optimization method that can generate the required coupling strength shape K(z) for any type of (passive) spectral response $A_2(\Delta\beta)$.

Theoretical Derivation

The objective is to produce a filter taper function giving a flat near unity transmission over the passband and sidelobe levels outside the passband suppressed to below −30 dB. We shall call the taper function K(z) giving the required response the ideal function $K_1(z)$. The method of variational optimization is used to produce the desired result. The method has been developed by the present inventors for synthesis of a co-directional coupler filter with very low sidelobes, as described in copending patent application Ser. No. 08/385,419. Here the method is applied to yield a spectral response with both low sidelobes and flat passband. The problem is solved for a normalized coupler, which is a coupler of unit length. Any coupler Of arbitrary length can be constructed from the normalized solution, by a straightforward scaling law, as will be shown below.

For theoretical purposes, an initial non-ideal coupler shape $K_0(z)$ is assumed. This initial function $K_0(z)$ may be any arbitrary, non ideal taper shape function. The following vector functions is defined:

$$E(k) = [e(k_0), e(k_0), \ldots, e_m(k_0),] \quad \text{Equation (9)}$$

The component $e_i$, $\{i=1 \ldots m\}$ either described the error between the desired sidelobe level and the current sidelobe level for shape $K_0$ and sidelobe i, or described the error between the power level at some wavelength i in the passband and unity for shape $K_0$, for each of the m wavelengths considered.

Algebraically, $e_i = (\sigma_i - \rho_i)$ where $\sigma_i$ is either the desired sidelobe level for sidelobe i, or is unity, and $\rho_i$ is either the current level for sidelobe i, or is the transmission value of wavelength i in the passband. The total number of points m may be arbitrarily chosen to cover the wavelength range of interest.

The arbitrary coupling coefficient is represented as $K(z) = \Sigma^N \alpha_n f_n(z)$, where the $f_n$ is an arbitrary set of functions. The unknowns are the coefficients $\alpha_n$ which are written in a vector, $\vec{k} = (\alpha_1, \alpha_2, \ldots \alpha_N)$. Given an initial state $\vec{k}_0$, an improvement to $\vec{k}_0$ denoted by $\vec{k}^* = \vec{k}_0 + \Delta \vec{k}$ is found by evaluating the incremental improvement vector $\Delta \vec{k}$, $$\Delta \vec{k} = \alpha J^T (JJ^T)^{-1} E(\vec{k}_o) \quad \text{Equation (10)}$$

where $J_{ij} = \partial e_i / \partial k_j$ the Jacobi matrix, and $\alpha$ is a scaling parameter used to decelerate the convergence. Equation (10) is repeatedly applied until a satisfactory optimization is achieved. Hence the optimum value is analytically given by the function $K(z) = \Sigma \alpha_n f_n(z)$.

Optimum Coupler Shapes

Using the method outlined in equations 9 and 10 above, an ideal taper function $K_1(z)$ is synthesized for the grating assisted coupler with two design criteria:

(i) All out of band sidelobes are suppressed to below −30 dB, (ii) the passband power transmission exceed 99.5% of the transmission at the central wavelength, and covers a wavelength which extends 25% of the half power bandwidth and which is centered on the design wavelength. The half power bandwidth is defined as the wavelength range in which the power transmission falls to one half the transmission at the center wavelength.

The resulting ideal interaction strength as a function of the propagation distance z is shown in FIG. 5. This taper function is given analytically by $$K_1(z) = A_1 e^{-\alpha_1(z-z_1)^2} + A_2 e^{-\alpha_2(z-z_2)^2} + A_3 e^{-\alpha_3(z-z_3)^2} \quad 0 < z < 1 \quad \text{Equation (11)}$$

where $K_1(z)$ is the normalized interaction strength along the propagation direction, and the constant coefficients are
$A_1 = 8.774$; $A_2 = -3.45$; $A_3 = 1.183$;

$\alpha_1 = 51.87$; $\alpha_2 = 34.49$; $\alpha_3 = 20.63$;
$z_1 = 0.28$; $z_2 = 0.60$; $z_3 = 0.75$.

It can be seen from FIG. 5 that the coupling coefficient $K_1(z)$ takes on both positive and negative values. It is well known that when the coupling strength $K_1(z)$ changes sign, as it does at $z = 0.462$ and $z = 0.777$ in FIG. 5, a $\pi$ phase shift should be introduced into the grating at this location. This $\pi$ phase shift has the effect of changing the sign of $K_1(z)$.

A $\pi$ phase shift is realized in practice by sliding the grating period forward or backward by exactly one half period at this location. This is shown schematically in FIG. 6a, where the $\pi$ phase shift is provided by two consecutive half period grating "etches" (or spaces) and in FIG. 6b it is formed by two consecutive half period grating "teeth".

The spectral response of a grating coupler using the ideal taper function $K_1(z)$ of equation (11) and simulated using the coupled mode equations (7a and 7b) and shown in FIGS. 7a and 7b. The ordinate of FIG. 7a is a linear power scale and shows the flat, near unity passband characteristics. Greater than 99.5% of the input power is transmitter over the flat passband. FIG. 7b is in a logarithmic scale (dB) and shows that the out of band sidelobes are suppressed below −30 dB. The abscissas of FIGS. 7a and 7b ($\Delta\beta$) are in normalized detuning units of radians (rad). The normalized detuning $\Delta\beta$ may be related to the actual wavelength $\lambda$ for a specific device design.

To further support this design, a two dimensional structure is simulated by the Beam Propagation Method (BPM). This method is a numerical method which solves the wave equation in a dielectric structure for forward propagating fields. Referring to FIG. 2, the structure parameters are:
$n_1 = 1.0$, $n_2 = 3.4$, $n_3 = 3.0$, $n_4 = 3.4$, $n_5 = 3.0$,
$d_1 = 0.5$ μm, $d_2 = 0.25$ μm, S = 0.90 μm, h = 0.025 μm, T = 14.456 μm, and the device length is $L_c = 5$ mm.

FIGS. 8a and 8b show the wavelength response of the grating-assisted coupler. The ordinate in FIG. 8a is in a linear power scale to show the flat near unity transmission of the passband, while FIG. 8b has a logarithmic transmission scale (in dB) to show the sidelobes suppressed below −30 dB.

Since the BPM is a rigorous numerical solution, this simulation shows the close correspondence which may be realized in practice. In this simulated structure the waveguides remain parallel, and a variation in $K_1(z)$ is achieved by modulating the index contrast of the grating. FIG. 9 shows the index contrast as a function of distance for this particular device. At positions $z = 2.31$ mm and $z = 3.89$ mm, a $\pi$ phase shift is introduced to effectively change the sign of $K_1(z)$.

Practical Implementations of the Coupling Strength TAPERING.

The ideal taper function of Equations (11) is in normalized form, which is the form for a coupler with unit length, $\{0 < z < 1.0\}$. Let Z be the distance in physical units, such as μm, $L_c$ be the length of the grating region in physical units, and $\bar{K}_1(z)$ be the interaction strength of this physical device. Then the scaling laws that related the normalized solution to the physical solution are (i) $Z = zL_c$, and (ii) $\bar{K}_1(Z) = K_1(z)/L_c$.

Thus any physical device is simply related to the normalized ideal solution through the required physical device length $L_c$.

In general there are three factors which determine the coupling strength, and which all design methods seek to manipulate. These three factors are: (a) the total electric field within the grating region, (b) the actual or effective size of the grating region, and (c) the difference in the refractive index values which make up the low index portion and high index portion of the grating.

Thus there are various ways in which the coupling strength $K_1(z)$ may be varied by changing some physical parameter of the real device to modify one of the factors (a)(b) or (c) above. These include varying:

(i) the separation between the two waveguides:

(See FIG. 10a) The waveguide modes interact through the overlap of their electric fields in the grating region. By varying the waveguide separation, this method seeks to manipulate the amount of electric field in the grating region and modify factor (a) above.

(ii) the vertical height of the grating:

The coupling strength is proportional to the reflections in the grating region. A deeper grating causes increased reflections and increased interaction of the electric field with the grating, manipulating factor (b) above. The taper function can thus be modulated as shown schematically in FIG. 10b to provide the required interaction strength along the length of the grating.

(iii) the duty cycle of the grating:

A rectangular grating shape is fundamentally composed of sinusoidal shapes or harmonics, in terms of a Fourier series. Only the first sinusoidal harmonics contribute to synchronous coupling between two interacting modes. The magnitude of the first harmonic depends on the duty cycle of the grating through its Fourier series. Modulation of the duty cycle, i.e. the tooth width of the grating, as shown schematically in FIG. 10c, thus modulates the "effective height" of the grating, as in case (i) above.

(iv) the index contrast of the grating:

The coupling in the grating occurs because of coherent reflections from the periodic grating structure which results from index contrast, for example, by varying doping concentration or material composition of the grating, in fabrication of the waveguides. The strength of these reflections is determined by the size of the grating, and the index difference, or contrast, of the two index values making up the grating (FIG. 10d).

(v) the grating width:

Since the coupling strength is proportional to the electric field in the grating region, by manipulating the spatial width of the grating, e.g. as shown in FIG. 10e, the amount of electric field in contact with the grating is varied.

(vi) the horizontal width of the grating:

In a filter structure represented by FIGS. 10f, for example, modulating the horizontal width of the grating along the ridge waveguide coupler varies the amount of reflection and hence modulates the interaction strength in a manner similar to modulation of the vertical height of the grating in (ii) or the modulation of grating width as in (v).

To implement the required taper function by modulating one of the grating parameters, one needs to know how $K_1(z)$ changes with a change in the chosen parameter. Calling this parameter p, such as the grating height or waveguide separation, at the central wavelength $\lambda_0$, the power in the coupled waveguide varies as $\sin^2(K_1 Z)$ when the physical coupling strength is held constant. One holds the physical parameter p constant, then locates the length at which the maximum power occurs, $Z=L_{max}$. Then this corresponds to $K_1 L_{max}=\pi/2$ hence $\overline{K}_1=\pi/2L_{max}$. Thus by measuring $L_{max}$ for various choices of the physical design parameter p, one can obtain a relation between the coupling strength $\overline{K}_1$ and the varied parameter.

This relationship between the coupling strength $\overline{K}_1$ and the design parameter p is plotted on a graph and the curve is fitted to an appropriate curve $\overline{K}_1$ as a function of p. In practical cases, often only a few points need to be measured for p and $\overline{K}_1$ to obtain good curve fitting. Alternatively, the coupling strength may be computed by one of the known mathematical methods cited in the references herein.

Hence, by varying the physical parameter as a function of distance Z, $\overline{K}_1(z)$ is to be varied according to the design formula (11) and the scaling laws relating Z to z and $K_1$ to $\overline{K}_1$.

In all of the foregoing implementation methods, it is important to insure that at the central wavelength $\lambda_0$, the grating period matches the propagation constant of the modes. That is $$T = \frac{2\pi}{|\beta_2(\lambda_0) - \beta_1(\lambda_0)|}$$

where $\beta_1$ and $\beta_2$ are the propagation constants of the two guided modes. The propagation constants may change along the length of the device, that is $\beta_{1,2}(\lambda_0) \rightarrow \beta_{1,2}(\lambda_0, Z)$, due to the change in physical parameters necessary to modulate $\overline{K}_1$. In this case, the period T should also be varied along the devices, so that at all points $$T = \frac{2\pi}{|\beta_2(\lambda_0, Z) - \beta_1(\lambda_0, Z)|}$$

The practical embodiments of the invention may be implemented in grating assisted filter couplers fabricated by known methods from III–V, II–VI alloy compounds as well as a Si/Ge alloy system. The configurations are also applicable for silica, glass, polymer and photo-refractive materials such as lithium niobate. As illustrated by the structures shown in the Figures, both vertical and lateral coupling are contemplated.

Waveguides may optionally be provide with electrode means to effect electro-optic tuning of devices.

Thus while particular embodiments are described in detail, many variations and modifications of these embodiments fall within the scope of the following claims.

What is claimed is:

1. A grating-assisted filter coupler comprising: a first waveguide for receiving an optical signal having at least one predetermined wavelength, and a second waveguide in a spaced relationship to the first waveguide, a grating region providing selective coupling of said predetermined wavelength between the first waveguide and the second waveguide, the coupling between first and second waveguides being tailored by a taper function defining an interaction strength given by $$K_f(z) = A_1 e^{-\alpha_1(z-z_1)^2} + A_2 e^{-\alpha_2(z-z_2)^2} + A_3 e^{-\alpha_3(z-z_3)^2} \quad 0 < z < 1$$

where: $K_f(z)$ is the normalized interaction strength along the propagation direction;

$A_1$, $A_2$, $A_3$; $\alpha_1$, $\alpha_2$, $\alpha_3$; $z_1$, $z_2$, $z_3$; are sets of constant coefficients determined to provide a specific level of sidelobe suppression and passband response;

and z is the normalized propagation distance along the coupler.

2. A grating assisted filter coupler according to claim 1 and having a passband center at a selected wavelength characterized by a half-power bandwidth, wherein constant coefficients are determined to provide an out-of-band sidelobe suppression ratio of greater than −30 dB, and a passband response that is flat and has a transmission of greater than 99.55% of the transmission at the passband centre, over a wavelength range of 25% of the half-power bandwidth.

3. A grating-assisted filter coupler comprising a first waveguide for receiving an optical signal having at least one predetermined wavelength, and a second waveguide in a spaced relationship to the first waveguide, a grating region providing selective coupling of said predetermined wavelength between the first and second waveguide along a coupler length $L_c$, the coupling being determined by an interaction strength function defining spectral characteristics of the filter coupler, determined by $$K_f(z)=A_1e^{-\alpha_1(z-z_1)^2}+A_2e^{-\alpha_2(z-z_2)^2}+A_3e^{-\alpha_3(z-z_3)^2} 0<z<1$$

where $K_f(z)$ is the normalized interaction strength along the propagation direction, and the constant coefficients are $A_1=8.774$; $A_2=-3.45$; $A_3=1.183$;

$\alpha_1=51.87$; $\alpha_2=34.49$; $\alpha_3=20.63$;

$z_1=0.28$; $z_2=0.60$; $z_3=0.75$;

where z is the normalized distance and is related to the physical distance $Z=zL_c$, where $L_c$ is the coupler length.

4. A grating assisted filter coupler according to claim 3 wherein the specified interaction strength is produced by defining the space relationship between the first and second waveguides as a function of Z.

5. A grating assisted filter coupler according to claim 3 wherein the grating region is characterized by a refractive index contrast modulation and the specified interaction strength is produced by defining the refractive index contrast modulation of the grating region as a function of Z.

6. A grating assisted filter coupler according to claim 3 wherein the specified interaction strength is produced by defining a duty cycle of the grating region as a function of Z.

7. A grating assisted filter coupler according to claim 3 wherein the specified interaction strength is produced by defining the height of a surface corrugation grating region as a function of Z.

8. A grating assisted filter coupler according to claim 3 wherein the specified interaction strength is produced by defining a width of the grating region as a function of Z.

9. A grating assisted filter coupler according to claim 3 wherein at least one of said first and second waveguides is a ridge waveguide and the specified interaction strength is produced by defining a ridge width of the at least one ridge waveguide as a function of Z.

* * * * *